United States Patent [19]

Muhs et al.

[11] Patent Number: 5,260,520
[45] Date of Patent: Nov. 9, 1993

[54] APPARATUS FOR WEIGHING AND IDENTIFYING CHARACTERISTICS OF A MOVING VEHICLE

[75] Inventors: Jeffrey D. Muhs, Clinton; John K. Jordan, Oak Ridge; Kenneth W. Tobin, Jr., Harriman; John V. LaForge, Knoxville, all of Tenn.

[73] Assignee: Martin Marietta Energy Systems, Inc., Oak Ridge, Tenn.

[21] Appl. No.: 864,888

[22] Filed: Apr. 2, 1992

[51] Int. Cl.⁵ .................. G01G 3/14; G01G 19/52
[52] U.S. Cl. ....................... 177/210 R; 177/1; 177/132
[58] Field of Search ............ 177/1, 132, 210 R

[56] References Cited

U.S. PATENT DOCUMENTS

| | | | |
|---|---|---|---|
| 3,276,525 | 10/1966 | Cass | 177/132 |
| 3,393,757 | 7/1968 | Tonies. | |
| 4,160,522 | 7/1979 | Dikinis et al. | 235/454 |
| 4,293,766 | 10/1981 | Long et al. | 235/462 |
| 4,339,010 | 7/1982 | Malikov et al. | 177/134 |
| 4,427,881 | 1/1984 | Ruell | 250/227 |
| 4,482,890 | 11/1984 | Forbes et al. | 340/556 |
| 4,560,016 | 12/1985 | Ibanez et al. | 177/210 |
| 4,667,757 | 5/1987 | Johnson | 177/1 |
| 4,712,423 | 12/1987 | Siffert et al. | 177/132 X |
| 4,734,577 | 3/1988 | Szuchy | 250/227 |
| 4,793,429 | 12/1988 | Bratton et al. | 177/210 R |
| 5,111,897 | 5/1992 | Snyder et al. | 177/132 |

*Primary Examiner*—Benjamin R. Fuller
*Assistant Examiner*—Randy W. Gibson
*Attorney, Agent, or Firm*—E. L. Larcher; J. A. Marasco; H. W. Adams

[57] ABSTRACT

Apparatus for weighing a vehicle in motion is provided by employing a plurality of elongated fiber-optic sensors defined by an optical fiber embedded in an encasement of elastomeric material and disposed parallel to each other on the roadway in the path of moving vehicles. Each fiber-optic sensor is provided with contact grid means which can be selectively altered to provide the fiber-optic sensors with sensitivities to vehicular weight different from each other for weighing vehicles in an extended weight range. Switch means are used in conjunction with the fiber-optic sensors to provide signals indicative of the speed of the moving vehicle, the number of axles on the vehicle, weight distribution, tire position, and the wheelbase of the vehicle. The use of a generally N-shaped configuration of switch means also provides a determination of the number of tires on each axle and the tire footprint. When switch means in this configuration are formed of optical fibers, the extent of light transmission through the fibers during contact with the tires of the vehicle is indicative of the vehicle weight.

20 Claims, 5 Drawing Sheets

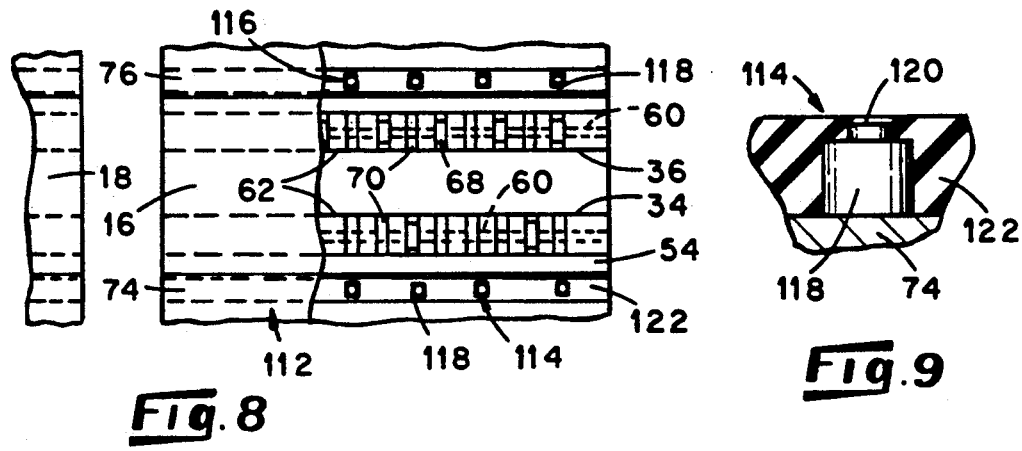
Fig. 8
Fig. 9
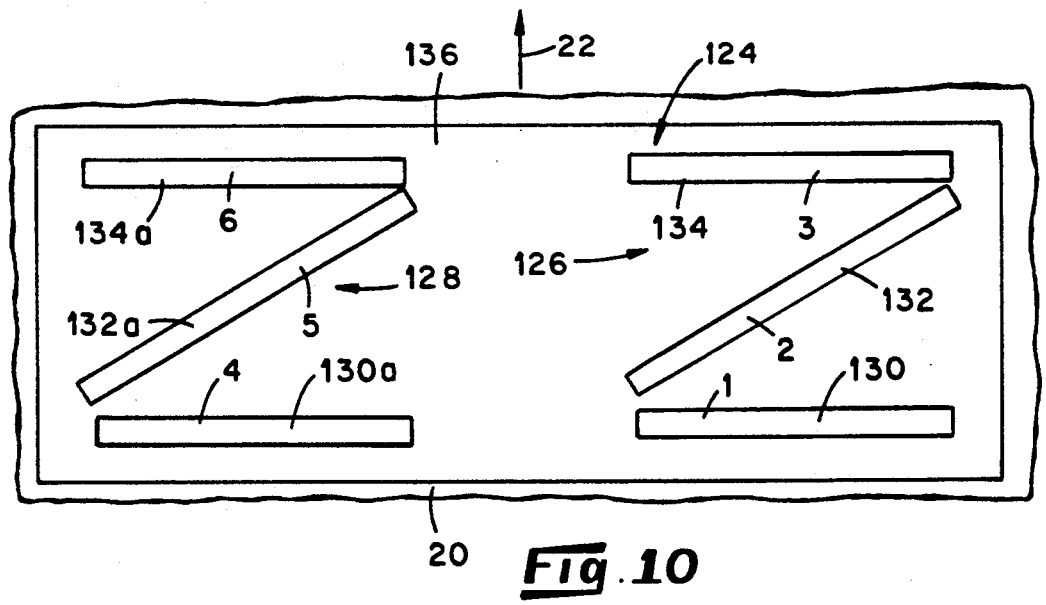
Fig. 10
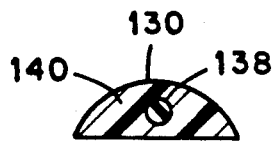
Fig. 11
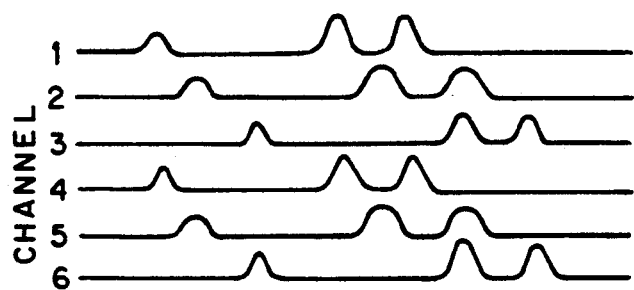
Fig. 12

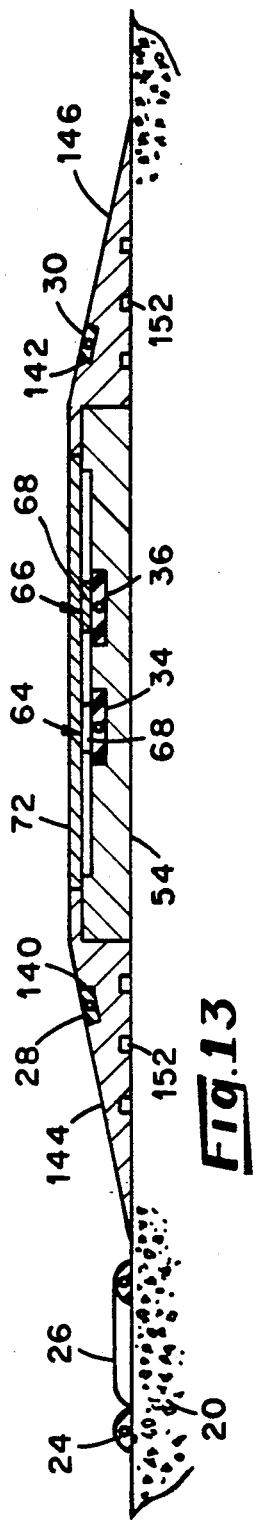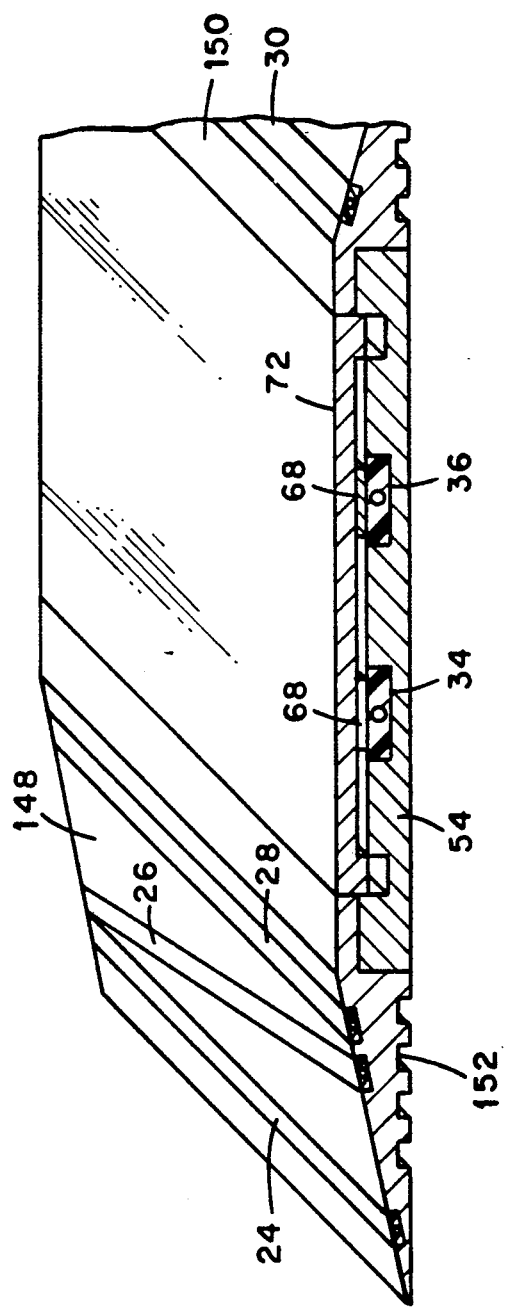

APPARATUS FOR WEIGHING AND IDENTIFYING CHARACTERISTICS OF A MOVING VEHICLE

This invention was made with the support of the U.S. Government under contract No. DE-AC05-84OR21400 awarded by the U.S. Department of Energy, Office of Arms Control. The U.S. Government has certain rights in this invention.

BACKGROUND OF THE INVENTION

The present invention relates generally to apparatus for weighing a vehicle in motion, and more particularly to such apparatus employing fiber-optic sensors and switching mechanisms for determining the weight and other characteristics of the vehicle in motion including the number of axles, weight distribution on the axles, wheel base, axle width, number of tires on each axle, weight distribution on the tires of each axle, speed of the vehicle, and tire footprint.

At the present time the weighing of vehicles is primarily achieved by using static weighing systems utilizing hydraulic load cells and/or mechanical lever mechanisms. The use of such static weighing systems is fairly common at truck weighing stations and at mining and agricultural facilities. However, recent efforts have been made to provide vehicle weighing systems that are capable of accurately determining the weight of a vehicle while it is in motion since many benefits can be derived from such a capability. For example, in the transportation industry the use of weigh-in-motion systems on the various highways traveled by trucks and other heavy vehicles would be highly beneficial since such vehicles would no longer be required to stop at weighing stations using static weighing systems and thereby significantly reducing law enforcement costs associated with the installation, maintenance, and operation of such road side weighing stations. Further, the dangers associated with the roadside weighing stations as created by the truck traffic in the area of the weighing stations will be obviated. Also, airports for commercial and/or military air traffic would benefit from the use of a relatively low cost, weigh-in-motion system. For example, at a commercial or military air field a weigh-in-motion system placed on the taxiway could be used to weigh the aircraft prior to take-off so as to instantly provide the pilot and control tower personnel with information pertaining to the weight of the aircraft as well as the weight distribution on the individual axles and tires of the aircraft for promoting inflight safety and enhancing fuel efficiency. Additionally, the replacement of the static weighing systems usually employed at mines, agricultural, and landfill sites with weigh-in-motion systems would considerably expedite the weighing process and increase the operational efficiency of the facility.

There are several varieties of weigh-in-motion systems currently available which use various types of mechanisms for weighing the moving vehicle. The most common of these weighing systems rely on piezoelectric sensors, hydraulic load cells, bending plate strain gauges, linear variable differential transformers, and capacitive mats. Hydraulic load cells and bending plate strain gauges are considered to be the more accurate of these mechanisms while the systems using piezoelectric sensors and capacitive mats are considerably less expensive than the systems utilizing hydraulic load cells. However, the presently available systems using piezoelectric sensors and capacitive mats have not been found to be capable of providing the desired level of accuracy required for many weigh-in-motion applications.

Recent developments in weigh-in-motion systems utilize fiber-optic mechanisms in the system for determining the weight of the moving vehicle. For example, in U.S. Pat. No. 4,560,016, an optical-fiber grid embedded in a rubber pad is placed on the roadway in the path of the moving vehicle. When a vehicle passes over the pad, the dynamic weight of the vehicle is imposed on the pad and the optical-fiber grid contained therein to bend or pinch the fibers through an array of bending and/or pinching fixtures to attenuate the light passing through the optical fibers. By calculating the amount of light attenuation, the weight at each axle of the moving vehicle can be determined with the combined weight at the various axles being indicative of the total vehicle weight. This patent is incorporated herein by reference for its discussion of previously known weigh-in-motion systems and the teachings therein pertaining to fiber-optic technologies including the electronics for transforming the optical signals provided by the bending of the fibers into the calculated weight of the vehicle in motion.

While the aforementioned patented system represents a considerable departure from the mechanism usually used in weigh-in-motion systems, there are still several desirable goals to be achieved in order to assure accuracy of such systems for the weighing of vehicles in a wide range of vehicle weights. Also, it is desirable for such a system to have the capability of determining and/or identifying other physical parameters or characteristics of the vehicle being weighed, such as the vehicle speed, the number of axles, weight distribution, the number of tires on each axle, the weight distribution on the tires on each axle, tire footprint, and the wheel base of the vehicle.

SUMMARY OF THE INVENTION

It is an object of the present invention to provide a relatively low cost and readily portable apparatus for accurately weighing vehicles in motion as well as accurately identifying other vehicle characteristics such as described above that can be utilized in highway vehicle weighing applications as well as at sites such as airports, quarries, mines, agricultural mills, landfills, and any other location where weighing vehicles in motion would be advantageous.

Another object of the present invention is to provide an apparatus for the weighing of vehicles in motion by employing a plurality of fiber-optic sensors with each fiber-optic sensor being selectively sensitive to a weight range different from that of other fiber-optic sensors in the apparatus so as to provide an array of fiber-optic sensors capable of accurately weighing vehicles over a wide range of weights.

Another object of the present invention is to provide such weigh-in-motion apparatus with switch means for providing signals indicative of the speed of the vehicle passing over the fiber-optic sensors for adjusting the weight calibration in accordance with the speed of the vehicle.

Another object of the present invention is to provide the apparatus with elongated switching mechanisms using optical fibers and/or pressure actuated control switches with one of these switching mechanisms being positioned at an angle to other switching mechanisms positioned perpendicular to vehicular traffic so as to provide signals indicative of the axle spacing, number of tires on each axle, tire positions, and the tire footprint of the vehicle being weighed. These parameters are not only desired for the applications mentioned above, but also can be incorporated in the vehicle weighing process for more accurately weighing of the vehicles.

A further object of the present invention is to provide a weigh-in-motion apparatus formed of two units of the fiber-optic sensors and switch means positioned in a side-by-side relationship on the roadway in the path of a moving vehicle for increasing the accuracy of the vehicle weighing function of the apparatus as well as providing signals indicative of axle width and weight distribution on the tires on each axle.

A further object of the present invention is to provide an apparatus for determining characteristics of a moving vehicle including the total weight, number of axles, number of tires on each axle, weight distribution on each axle, speed of the vehicle, and tire footprint provided by the tires on each axle by positioning two sets of optical-fiber assemblies in the path of the vehicle and side-by-side relationship with each set being formed of three elongated optical-fiber assemblies in a generally N-shaped configuration.

Other and further objects of the present invention will become obvious upon an understanding of the illustrative embodiments about to be described or will be indicated in the appended claims, and various advantages not referred to herein will occur to one skilled in the art upon employment of the invention in practice.

DESCRIPTION OF THE DRAWINGS

FIG. 8 is a top plan view partly broken away of another embodiment of the apparatus of the present invention using fiber-optic sensors as in the embodiment of FIG. 4 but employing a plurality of discrete on/off switches in place of the single elongated on/off switches for providing signals indicative of the tire footprint, tire position, and number of tires on each axle;

FIG. 9 is an enlarged sectional view of a contact switch useful in the practice of the embodiment of FIG. 8;

FIG. 10 is a schematic plan view of a still further embodiment of the apparatus of the present invention in which optical-fiber assemblies are positioned on the roadway in a generally N-shaped configuration for accurately weighing vehicles in motion as well as providing other vehicle characteristics such as provided by the embodiment of FIG. 1;

FIG. 11 is a vertical sectional view of an encased optical-fiber assembly usable in the embodiment of FIG. 10;

FIG. 12 is a multiple channel graph illustrating wave forms generated by the passage of a tandem axle vehicle over the embodiment of the apparatus of FIG. 10 for providing information such as depicted in the graph of FIG. 3;

FIG. 13 is a vertical sectional view showing the embodiment of FIG. 1 placed on a vehicular roadway with the fiber-optic sensors and a portion of the switches contained in a housing provided with ramps for facilitating the passage of the vehicle over the fiber-optic sensors and switches;

FIG. 14 is a perspective sectional view of the embodiment of FIG. 1 placed on a vehicular roadway with the fiber-optic sensors and all of the switches contained within a housing provided with vehicle ramps.

Figure 1:
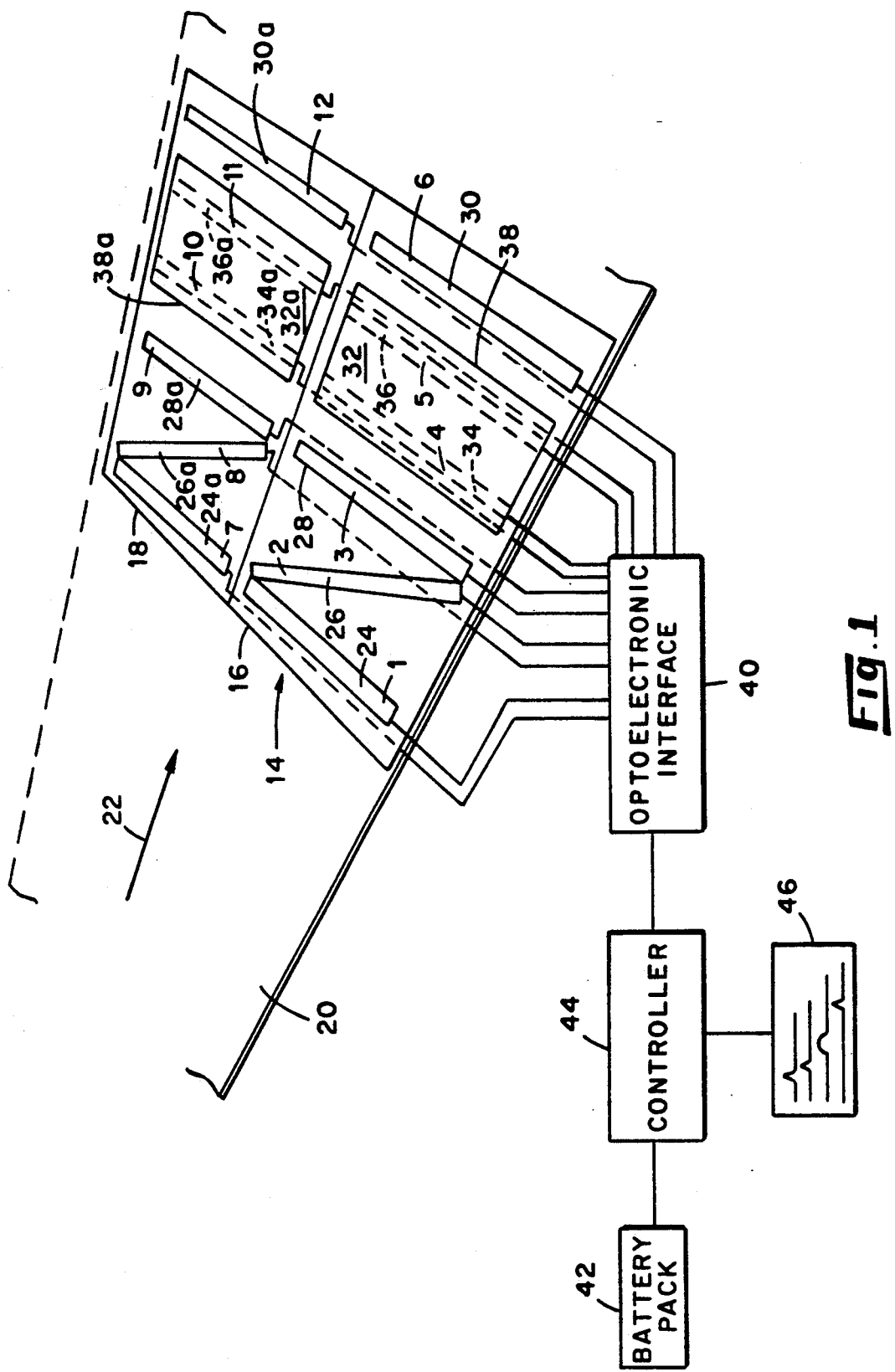
FIG. 1 is a schematic perspective view of one embodiment of the present invention employing a plurality of fiber-optic sensors and switch mechanisms for accurately weighing vehicles in motion and identifying other vehicle characteristics such as described above.

Preferred embodiments of the invention have been chosen for the purpose of illustration and description. These preferred embodiments are not intended to be exhaustive or to limit the invention to the precise forms shown. These preferred embodiments are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

In the embodiments described below, the apparatus of each embodiment is illustrated as being provided by two similarly constructed system assemblies or units placed side-by-side across a lane of traffic for moving vehicles. However, if desired, a single system of sufficient width to provide the desired weighing and other functions may be utilized in place of the two unit system. The similarly constructed components in the illustrated embodiments using side-by-side units are identified by the same reference numerals but with the reference numerals of one unit including the letter "a" to distinguish the units apart from one another. Also, similar components employed in the embodiments illustrated in the various figures are identified with the same reference numerals.

Figure 2:
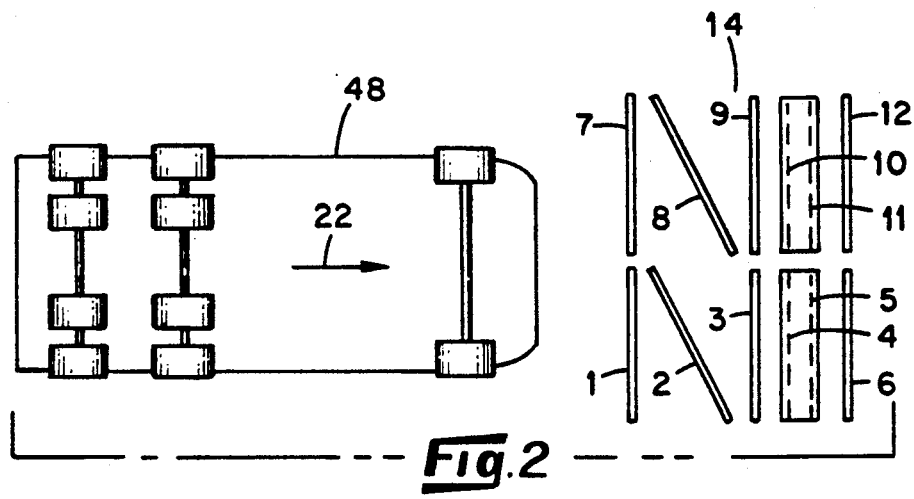
FIG. 2 is a schematic plan view of a vehicle approaching the apparatus of FIG. 1.
Figure 3:
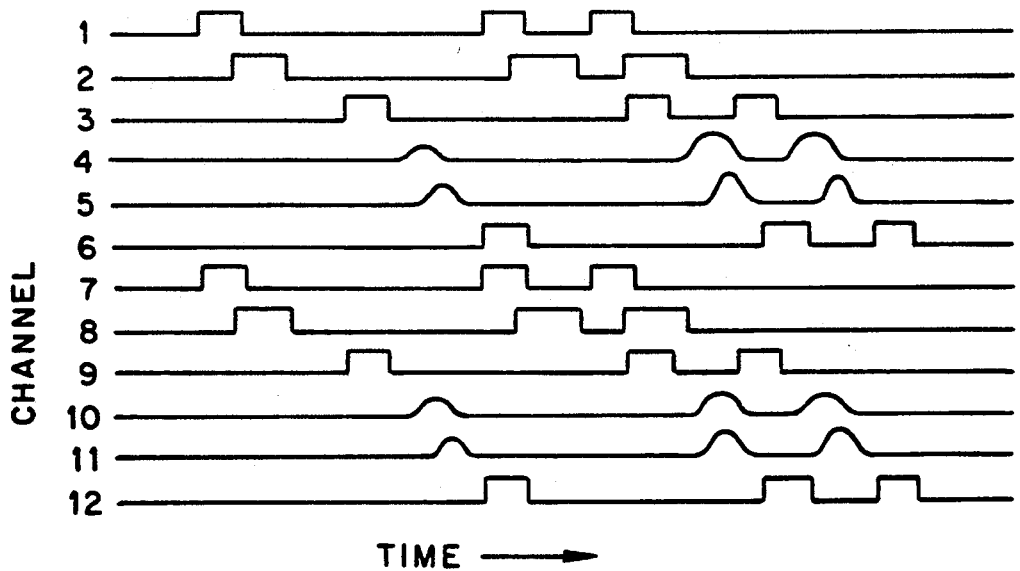
FIG. 3 is a multiple channel graph illustrating the wave forms generated from signals derived from the apparatus of FIG. 1 by the passage of the vehicle of the type depicted in FIG. 2 thereover.

With reference to the embodiments of FIGS. 1-3, the weigh-in-motion apparatus generally shown at 14 is formed of two similarly constructed system assemblies or units 16 and 18 placed side-by-side across a roadway 20 at an angle perpendicular to the vehicular traffic on the roadway 20 moving in a direction indicated by arrow 22. This apparatus also accurately determines the vehicle velocity, number of axles on the vehicle, the wheel base, the weight distribution on each axle, the number of tires on each axle, tire position, and the tire footprint, any one or more of which can be used to increase the accuracy of the vehicle weighing operation.

With particular reference to system unit 16, switches 24, 26, and 28 are placed at the front of the apparatus 14 facing approaching vehicles. These switches are oriented in a generally N-shaped configuration as defined by the parallel switches 24 and 28 being positioned at spaced apart locations and perpendicular to the vehicular path while the switch 26 is positioned diagonally between switches 24 and 28 with the opposite ends of the switch 26 located near the opposite ends of switches 24 and 28. A further switch 30 is positioned parallel to switches 24 and 28 and located a sufficient distance from the switch 28 so as to contain the fiber-optic vehicle weighing mechanism 32 therebetween, as will be described below. The switches 24, 26, 28, and 30 are single elongated on/off switches each of a length of about 48 to 60 inches which is adequate to span about one-half of a vehicle lane on a roadway. These switches may each be formed of a simple metallic contact switch or, preferably, an optical fiber embedded in a suitable elastomeric material such as rubber, polyurethane, or polyethylene for providing it with protection from weather as well as against over stressing and other abuse from vehicular traffic.

The optical fibers employed in the switches and the fiber-optic vehicle weighing mechanisms 32 of the present invention are preferably formed from silicone rubber due to its durability, compression repeatability, temperature response, and sensitivity to applied weight. With the optical fibers formed of transparent silicone rubber, the dynamic force applied by a vehicle through its tires onto the elastomeric encasement of the optical fiber generally attenuates the amplitude of light traveling through the optical fiber with the light attenuation increasing with increasing force applied to the optical fiber. This characteristic of the silicone rubber optical fiber occurs as the optical fiber is compressed from its original circular shape into an elliptical configuration having a smaller cross-sectional area than the circular shape so that less light will travel through the length of the fiber with the amount of light attenuation being directly proportional to the cross-sectional area of the fiber.

The parallel switches 24, 28, and 30 provide on/off signals used for determining the velocity of the vehicle, number of axles, and the wheel base, speed of the vehicle crossing the weighing mechanism 32 positioned between switches 28 and 30. The diagonal switch 26 is used for determining the number of tires on each axle, axle width, and the tire footprint.

The fiber-optic vehicle weighing mechanism 32 is shown provided with two elongated fiber-optic sensors 34 and 36 supported on a rigid base member 38. The fiber-optic sensors 34 and 36 are each provided by one or more elongated optical fibers, preferably formed of silicone rubber, embedded in elastomeric material and contained in a slot or groove in the surface of the base 38. While the silicone rubber optical fibers are preferably embedded in elastomeric material, these fibers can be satisfactorily used in the present invention without being so embedded.

In accordance with the present invention contact pressure grid means, as will be described in greater detail below during the description of the FIG. 4 embodiment, are provided in conjunction with each of the fiber-optic sensors 34 and 36 so as to provide the fiber-optic sensors with a degree of compression different from each other so that the extent of transmission loss or the change in the amplitude in light traveling through the optical fiber in fiber-optic sensor 34 will be different from that of the optical fiber in fiber-optic sensor 36 when they are exposed to the same dynamic loading.

By selecting the compression of the optical fibers in each fiber-optic sensor 34 or 36, these sensors can be tailored to provide signals or waveforms (FIG. 3) which are descriptive of the vehicular weight in a manner significantly more accurate and reliable than provided by using one or more optical fibers subject to equal compression and light transmission when exposed to the same vehicle loading.

As generally shown in FIG. 1, the fiber-optic sensors 34 and 36 are of a length generally corresponding to the length of the switches 24, 26, 28, and 30 so that the fiber-optic sensors 34 and 36 in each unit 16 and 18 when placed in a near end-to-end relationship will span essentially the full width of the lane of the roadway 20 or other site subject to vehicular traffic including aircraft. For example, if the system is used on a taxiway at an airport the length of the fiber-optic sensors and the switches in each system unit may be considerably longer than the 48 to 60 inches mentioned above so that each system unit will span approximately one-half of the taxiway.

When in a portable configuration, the apparatus 14 can be provided with removable ramps at the front and rear of the apparatus or at the front and rear of the weight determining mechanism 32 so that the movement of vehicular traffic over the ramp may be achieved without inducing abrupt changes in velocity and lift of the vehicle which detract from the accurate weighing thereof. With ramps at the front and rear of the weight determining mechanism 32, the switches 24 and 26 may be attached to the roadway by using double-faced tape or by nails or any other suitable attaching mechanism. The base 38 may be held in place on the roadway by simply using a suitable nailing arrangement or by underlining the base with double-faced tape. The thickness of the weight determining mechanism 32 is about one inch or less so that the vehicle will be subjected to minimal upward lift as it passes over the apparatus 14 especially when employing ramps with a sufficiently low angle of incline so as to avoid any abrupt lifting of the vehicle.

The on/off switches 28 and 30 are preferably placed on the ramps on either side of the base 38 or near the base 38 if the apparatus 14 is embedded within the roadway. The switches 28 and 30 are placed near the fiber-optic sensors 34 and 36 in order to measure the velocity of the vehicle across these sensors as being determined by the time lapse between the contacting of the switches 28 and 30 spaced a known distance apart from one another. A primary purpose for placing these switches 28 and 30 near the fiber-optic sensors 34 and 36 is that lighter weight vehicles tend to slow down significantly as they travel up an inclined surface as provided by the front ramp regardless of the incline angle of the ramp so that any velocity measurements taken by employing the switches at locations spaced much further apart from one another would likely be in error. This velocity measurement is a required portion of the algorithm used for accurately determining the weight of the vehicle. Thus, any errors associated with the velocity measurements will inherently affect the weight measurement. With the switches 28 and 30 near the fiber-optic sensors 34 and 36, a near instantaneous velocity of the vehicle can be measured as the vehicle crosses over the fiber-optic sensors.

One of the major problems associated with providing accurate weighing of vehicles in motion is that while most sources instinctively compare dynamic weight measurements taken from the given vehicle with vehicles of known static weight, the static and dynamic weight of the vehicle are two very distinctive and different physical measurements. The static weight of a vehicle is presumed to be fixed or static in nature while a vehicle traveling down a road is a dynamic weight which varies as a result of several physical phenomena acting simultaneously. Vehicle dependent sources of error can be directly attributed to various vehicle configurations which affect the applied dynamic force. Also, variations in suspension systems and tire characteristics such as temperature, air pressure, diameter, tread pattern, width, and balancing will effect the applied dynamic forces. The lift force induced upon the moving vehicle also effects the dynamic weight of the vehicle. However, generally speaking the lift force associated with a vehicle increases with the square of velocity of the vehicle. For example, if a truck weighing approximately 60,000 pounds having a aerodynamic lift coefficient of 0.4 and a plane area of 45 square meters and is traveling at 2 miles per hour, the induced lift force would be only about 10 pounds. However, since the lift force increases with the square of velocity the speed of the vehicle must be accurately determined so that the algorithm from the fiber-optic sensors 32 and 34 can be adjusted to compensate for any decreases in vehicle weight due to lift forces imposed on the vehicle traveling at various speeds.

As shown in FIG. 1 each of the switches and the fiber-optic sensors in both system units 16 and 18 are coupled through separate electrical cables to a suitable optoelectronic interface 40 which is powered by a suitable voltage supply such as provided by a battery 42 or a local utility and a controller 44 such as a microprocessor. The controller 44 is provided with a suitable data acquisition system for analyzing the signals from the optoelectronic interface 40 for providing readouts of vehicle data 46 (FIG. 3) indicative of the weight and other characteristics of the vehicle passing over the apparatus 14. Each of the switches and the fiber-optic sensors provide signals to the optoelectronic interface 40 where the signals are converted from analog to digital signals and individually interfaced with the data acquisition system in the microprocessor. Also, the optoelectronic interface 40 can be used to supply the light sources such as LED's for the fiber-optic sensors with a constant, temperature-compensated current as well as interfacing temperature measurements at the fiber-optic sensors with the data acquisition system in the microprocessor. Such temperature measurements are necessary for adjusting the algorithm to compensate for variations in the temperature of the roadway and fiber-optic sensors since the temperature of the fiber-optic sensors and the roadway may vary as much as about 60° F. on any typical day and thereby affect the mechanical behavior of the roadway and the fiber-optic sensors.

Each of the individual signals from the switches and the fiber-optic sensors are interfaced by the optoelectronic interface 40 as an individual channel in the microprocessor. Thus, the apparatus 14 with four switches and two fiber-optic sensors in each unit 16 or 18 will provide 12 channels of information as shown in FIG. 3 for providing the user valuable information concerning the characteristics of the vehicle passing over the apparatus 14. In FIGS. 1 and 2 the switches and fiber-optic sensors in the apparatus 14 are designated by numerals 1-12 for providing the individual signals that are processed by the data acquisition system to yield the twelve-channel readout shown in FIG. 3. This graphical data in FIG. 3 is with respect to time and illustrates the vehicular information gathered by the apparatus 14 when traversed by a tandem axle truck such as generally shown at 48 in FIG. 2. The waveforms of channels 1, 7, 3, 9, 6 and 12 are signals provided by the actuation of the parallel on/off switches 24, 24a, 28, 28a, 30, and 30a respectively, which are indicative of the vehicle velocity, number and spacing of axles, and the vehicle wheel base. Channels 2 and 8 are provided by the signals from diagonal switches 26 and 26a with the duration of these signals at the known vehicle velocity being indicative of the number of tires on each axle, axle width, tire position, and the tire footprint. The waveforms of channels 4, 5, 10, and 11 are derived from signals from the fiber-optic sensors 34, 36, 34a, and 36a respectively, and are descriptive of the vehicle weight.

The weigh-in-motion apparatus 50 illustrated in FIG. 4-7 is suitable for accurately weighing vehicles in motion as well as determining the vehicle speed, number of axles, and the weight distribution on the axles. This embodiment of the invention utilizes a weight determining mechanism 52 substantially corresponding to the vehicle weighing mechanism 32 of the FIG. 1 embodiment and can be embedded in the roadway 20 or used in a portable configuration on the surface of the roadway 20. In the portable configuration shown, apparatus 50 is formed of a rectangular base plate 54 of steel, aluminum, or the like and possesses sufficient rigidity to withstand dynamic loadings of up to about 30 tons without any physical deterioration such as warping, flexing and the like. The use of a rigid base plate 54 is important to assure that the weight of vehicles having abrupt or coarse tread patterns can be measured with a high level of repeatability. The base plate 54 is of a thickness in the range of about one-half to three-quarter inch thickness, preferably about five-eighths inches, and is of a length in the range of about 48 to 60 inches for roadways and substantially longer for aircraft taxiways.

Figure 4:
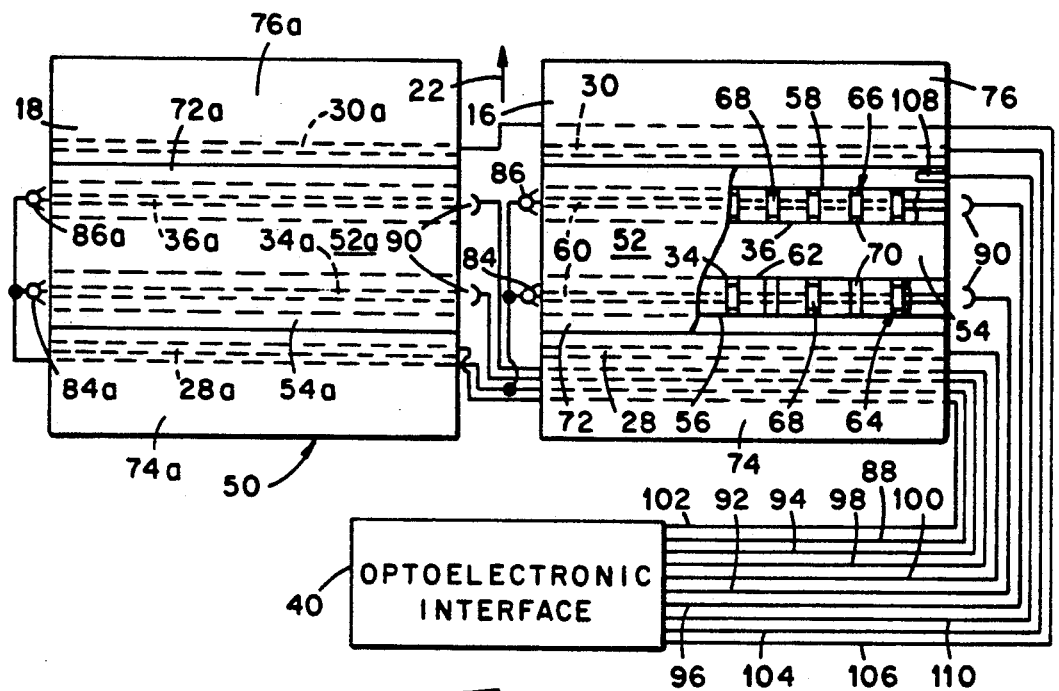
FIG. 4 is a top plan view partly broken away of another embodiment of the apparatus of the present invention using fiber-optic sensors as in FIG. 1 for accurately weighing a moving vehicle.

As shown in FIG. 4, the upper surface of the base plate 54 is provided with two longitudinally extending parallel grooves 56 and 58 which are of rectangular configurations and spaced apart from one another a distance of about 2 to 8 inches. These grooves are about one-fourth in depth and of about 0.5 to 2 inches wide. These grooves are utilized to house and protect the fiber-optic sensors 34 and 36. Additional grooves may be placed in the base plate 54 in order to house additional fiber-optic sensors and/or to allow for varying the spatial relationship between the fiber-optic sensors.

Figure 6:
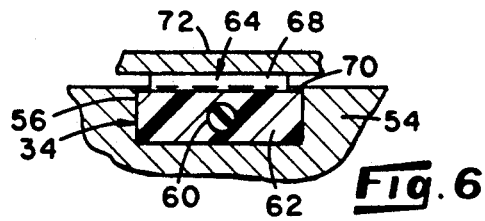
FIG. 6 is a vertical sectional view of a fiber-optic sensor used in the embodiments of FIGS. 1 and 4 for providing signals indicative of the vehicular weight.

As shown in FIG. 6, the fiber-optic sensors 34 and 36 are constructed of a single elongated fiber 60 of transparent silicone rubber embedded within an elastomeric encasement 62 formed of rubber, polyethylene, polyurethane or any other suitable elastomeric material. The encasement 62 is of a rectangular configuration having essentially the same dimensions as the grooves 56 or 58 so as to be essentially fully contained therein and be substantially flush with the upper surface regions of the base plate 52 adjacent to the grooves. The two fiber-optic sensors fiber-optic sensors 34 and 36 shown are used in order to increase the sensitivity of the vehicle weighing mechanism 52 for weighing vehicles within a relatively large range of weights. As described above, the fiber-optic sensors 34 and 36 are designed to be sensitive to different vehicle weights with fiber-optic sensor 34 being used for accurately weighing lighter vehicles and with the fiber-optic sensor 36 being used for accurately weighing heavier vehicles. However, while only two fiber-optic sensors are shown in the apparatus 50, it will appear clear that additional fiber-optic sensors can be utilized in a side-by-side relationship so as to further increase the sensitivity of the apparatus in FIGS. 1, 4, and 8 over an even greater dynamic weight range.

Figure 5:
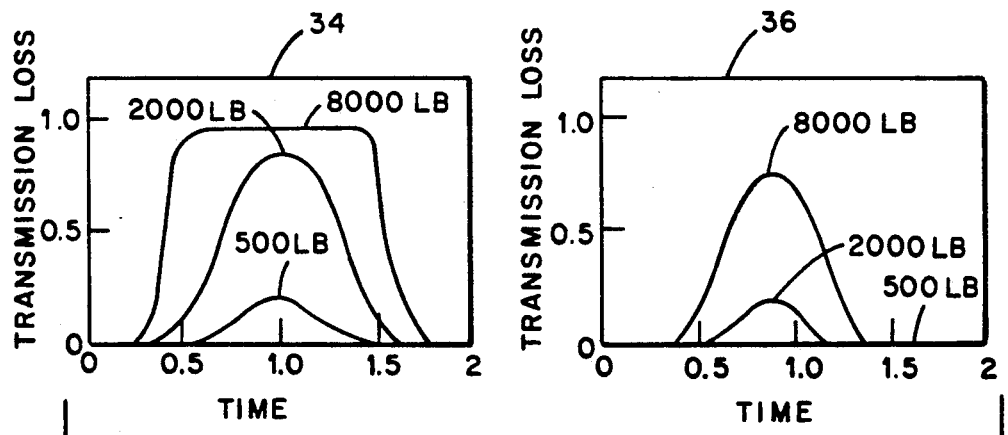
FIG. 5 is a graph illustrating the wave forms provided by the fiber-optic sensors of the FIG. 4 embodiment with the sensors each having a different sensitivity to vehicle weight for accurately weighing vehicles in a wide range of weights.

In order to selectively provide each fiber-optic sensor 34 or 36 with the desired sensitivity to a particular weight range, contact pressure grids 64 and 66 are utilized to transfer the dynamic loading to the embedded optical fiber 60 in sensor 34 and sensor 36 in a selected manner. By varying the grid configuration, the transmission loss through the optical fiber 60 versus the applied load thereon for each sensor 34 and 36 can be tailored to be sensitive to the dynamic weight ranges desired for accurately weighing vehicles in an extended weight range. The contact pressure grids 64 and 66 are used to apply the load onto the fiber-optic sensors so that as the contact pressure increases the sensitivity of the optical fiber 60 it also increases and thus decreases the dynamic range of the sensors 34 and 36 as shown in FIG. 5. The weight ranges shown in FIG. 5 for fiber-optic sensors 34 and 36 are merely exemplary since the fiber-optic sensors can be tailored through the use of the contact pressure grids to provide the fiber-optic sensors with any desired sensitivity.

The contact pressure grids 64 and 66 are each formed of round or rectangular steel bars, rods or dowel pins 68 of about 0.0156 to about 0.0625 inch in diameter that are placed on the surface of the encasement 62 perpendicular to the length of the fiber-optic sensors 34 and 36 at uniformly spaced apart locations. The length of the pins 68 is less than the width of the rectangular encasement 62 contained within the grooves 56 and 58 so that the displacement of the pins 68 by a dynamic loading on the grids 64 and 66 will be applied solely to the encasement 62 and the optical fiber 60 therein rather than being at least partially absorbed by the base plate 54. In order to tailor the sensitivity of the fiber-optic sensors, the spacing between the pins 68 on one sensor is different from pin spacing on the other sensor with such spacing being dependent upon the sensitivity desired of the particular sensor. To assure that the pins 68 are uniformly spaced apart in a desired spatial relationship for each grid 64 or 66, the encasement 62 may be provided with small surface indentations 70 placed at selected distances, e.g., one inch, apart from one another along the length of the encasement 62 so that during the tailoring of the sensitivity desired of the sensors 34 and 36 the pins 68 can be placed in selected indentations 70 to align the pins 68 as well as provide the desired spatial relationship of the pins 68. The indentations 70 can be easily formed in the surface of the encasement 62 during the formation thereof or by a simple milling operation.

The contact pressure grids 64 and 66 are held in place over the fiber-optic sensors 34 and 36 by a pressure plate 72 which is of a rectangular configuration slightly less in width but generally of a size corresponding to that of the base plate 54 and is positioned over the fiber-optic sensors 34 and 36 so as to provide the apparatus 50 with a flat upper surface. The pressure plate 72 is formed of steel, such as 16 gauge mild steel, and is separated from the base plate 54 at locations over the fiber-optic sensors 34 and 36 by the grids 64 and 66. The spacing between the pressure plate 72 and the base plate can be selectively adjusted by using shims or the like (not shown) with such spacing being sufficient to assure that any dynamic loadings applied on the pressure plate 72 will be transmitted to the fiber-optic sensors 34 and 36 rather than being partially absorbed by the base plate 54. A metal-to-metal stop (not shown) can be placed between the pressure plate 72 and the base plate 54 to assure that the optical fibers 60 will not be overloaded in the event an unexpectedly heavy dynamic weight is applied to the pressure plate 72. The pressure plate 72 may be attached to the base plate 54 by using set screws or the like which can be used to apply a calibrated pretension to the fiber-optic sensors 34 and 36 prior to vehicle calibration.

The ramp system for apparatus 50 is provided by a removable forward ramp 74 and a removable rear ramp 76 that are attached to the base plate 54 by suitable bolting, a tongue and groove arrangement or the like. These ramps 74 and 76 may be provided with grooves in the bottom surface thereof as will be shown below for routing electrical cables used for the fiber-optic sensors and the switches. Also, the underside surface of the base plate 54 may be provided with longitudinal grooves (not shown) for the routing of the electrical cables.

Figure 7:
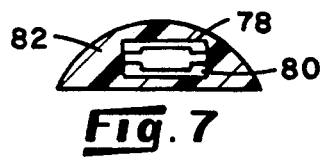
FIG. 7 is a vertical sectional view of an on/off switch assembly useful in conjunction with the fiber-optic sensors in the embodiment in FIGS. 1 and 4.

The embodiment of FIG. 4 is provided with on/off switches 28 and 30 with these switches being contained near the fiber-optic sensors 34 and 36 in suitable grooves in the ramps 74 and 76. These switches 28 and 30 as well as switches 24 and 26 each be formed of a silicone rubber optical fiber 60 embedded within a rectangular elastomeric encasement 62 such as shown in FIG. 6 and as used in the fiber-optic sensors. The thickness of the encasement 62 for the switches 24, 26, 28 and 30 is preferably slightly greater than the depth of the grooves containing the switches so as to provide the switch with on/off switching capabilities when the tires of a moving vehicle pass over the switches. Alternatively, the switches 24, 26, 28 and 30 may each be provided a simple on/off contact switch such as shown in FIG. 7 where normally spaced apart metal contacts 78 and 80 are housed within a rectangular or rounded encasement 82 of a flexible material such as rubber, polyethylene, or polyurethane. A dynamic load applied to the encasement 82 will close the contacts 78 and 80 for providing an "on" signal lasting for the duration of the contact.

Each of the fiber-optic sensors 34 and 36 are provided with light source 84 and 86 at one end of the fiber-optic sensors 34 and 36. These light sources may be provided by any suitable light transmitting device such as an LED. The light sources 84 and 86 are connected to the optoelectronic interface 40 by a suitable electrical cable 88. The fiber-optic sensors 34, 34a, 36 and 36a are provided with a light receiver such as generally shown at 90 and preferably provided by a suitable photodetector preamplifier for receiving light transmitted through the encased optical fibers 60 and are separately connected to the optoelectronic interface 40 by cables 92, 94, 96, and 98, respectively. The separate coupling of the fiber-optic sensors 34, 34a, 36, and 36a to the optoelectronic interface 40 is for the purpose of providing separate weight measurements at the interface 40 so as to provide a multiple channel readout, such as shown in FIG. 3, that is indicative of the weight measured at each fiber-optic sensor. The switches 28, 28a, 30, and 30a are coupled to the optoelectronic interface 40 by electrical cables 100, 102, 104, and 106, respectively. A temperature sensor provided by thermocouple 108 attached to the base plate 54 is coupled to the optoelectronic interface 40 by cable 110. The purpose of the temperature sensor was described above in the description of the FIG. 1 embodiment.

In operation of the apparatus 50, as the vehicle passes over the switches 28, 28a, fiber-optic sensors 34, 34a, 36, 36a, and the switches 30, 30a, signals therefrom are provided to the optoelectronic interface 40 that are indicative of the weight and velocity of the vehicle with these signals corresponding to the waveforms at channels 3, 9, 4, 10, 5, 11, 6, and 12, respectively, of FIG. 3.

With reference to the embodiments shown FIGS. 8 and 9, the apparatus 112 is constructed substantially similar to the apparatus 50 of FIG. 4 except for the switches 114 and 116 which replace switches 28 and 30 and, like apparatus 50, may be embedded in the roadway or provided with ramps. These switches 114 and 116 are provided by a plurality of individual contact switches which are separately connected to the optoelectronic interface 40 and are uniformly spaced apart from one another along the length of the base plate 54 with this separation between adjacent switches being in the order of about 2 to 4 inches. By using such a plurality of contact switches individually coupled to the optoelectronic interface 40, the number of tires of each axle as well as the axle width and the tire footprint of the moving vehicle being weighed can be identified so as to provide a more accurate reading of the vehicle characteristics and weight. These switches 114 and 116 may be formed by employing simple micro-switches as shown in FIG. 9 with the switch 118 including a movable contact 120 contained in an encasement material 122 such as used for the above described switches 28 and 30.

The apparatus 14, 50, and 112 of FIGS. 1, 4, and 8, with the fiber-optic sensors 34 and 36 properly tailored, provide for the weighing of a vehicle in motion having an axle weight in the range of about 0.1 to 30 tons per axle with a level of accuracy within about 0.5 to about 3 percent of the actual gross vehicle weight when measured at vehicle speeds in a range of about 2 to 65 or more miles per hour.

FIGS. 10 to 12 are directed to an apparatus 124 providing another embodiment of the present invention which is capable for providing all the vehicle characteristics of apparatus 14 in the FIG. 1 embodiment except that the weighing accuracy may be slightly less due to the lack of a dynamic variable weighing system. However, even though this apparatus 124 may be slightly less accurate in the weighing aspect as provided by the sensitivity tailored fiber-optic sensors, the apparatus 124 is expected to be useful in many applications where a high degree of accuracy in weighing vehicles is not essential. In this embodiment, the apparatus 124 comprises system units 126 and 128 positionable in a side-by-side relationship across a vehicle roadway. Each unit 126 and 128 is formed of three optical-fiber assemblies 130, 132, and 134. As shown, these optical-fiber assemblies are mounted on a base member 136 but they can be embedded in the roadway or individually attached in place onto the roadway surface by employing double-faced tape or by nailing. Each optical-fiber assembly 130, 132, and 134 as illustrated in FIG. 11 is preferably formed of an optical fiber 138 of silicone rubber embedded in an elastomeric encasement 140 of material similar to that used for the encasement 62 of the fiber-optic sensors 34 and 36 of FIG. 4. The encasement 140 is preferably provided with a rounded upper surface for facilitating the passage of a vehicle over the optical-fiber assemblies. The overall thickness of the optical-fiber assemblies is about one-fourth of an inch.

The optical-fiber assemblies 130, 132, and 134 are disposed in a generally N-shaped configuration with assemblies 130 and 134 being disposed parallel to one another at spaced apart locations and at an angle perpendicular to the vehicular traffic while the optical-fiber assembly 132 is diagonally positioned between the assemblies 130 and 134 with the opposite ends of the assembly 132 being positioned adjacent to opposite ends of the assemblies 130 and 134. The N-shaped configuration of the optical-fiber assemblies is substantially similar to that of the switches 24, 26 and 28 in the apparatus 14 of FIG. 1. Also, as with the apparatus 14, 50, and 112 of FIGS. 1, 4, and 8, the optical-fiber assemblies 130, 132, and 134 are individually coupled to an optoelectronic interface and control system with each of the optical-fiber assemblies providing a channel of information pertaining to the vehicular characteristics as shown in FIG. 12. The optical fibers in each optical-fiber assembly is compressed by one or more tires on the vehicle in contact therewith to provide a reading indicative of the weight of the vehicle while the diagonal optical-fiber assemblies 132 and 132a as shown at channels 2 and 5 respectively, provide signals indicative of the number of tires on each axle, axle width, and the tire footprint. The waveforms in FIG. 12 indicate that a tandem axle truck of a particular wheel base has passed over the apparatus 124 with the weight of the vehicle, speed of the vehicle, number of axles, weight distribution on each axle, wheel base, and other characteristics of the moving vehicle, such as mentioned above, readily determined from the information derived from the optical-fiber assemblies.

While the embodiments of FIGS. 1, 4, 8, and 10, as described above, preferably utilize optical fibers of silicone rubber as the preferred optical fiber, it will appear clear that the apparatus of these embodiments can function satisfactorily by using other forms of optical fibers. For example, optical fibers formed of glass, which may be encased in a suitable elastomeric material, can be used in place of the silicone rubber optical fibers by using microbending fixtures formed of alternately spaced or offset protrusions on the upper and lower surfaces of the optical-fiber or fiber encasement to provide the desired microbending of the optical fibers in response to the dynamic application of weight to the optical fibers. These microbending fixtures may be placed in a any desired pattern along the length of the each optical fiber so as to tailor the sensitivity of the optical fiber to a selected vehicle weight. Also, while the portable configuration of the apparatus described above employ a battery pack as the power supply, it will appear clear that if the apparatus is embedded in a roadway surface in a relatively permanent fashion, the power supply may be provided by the local utility.

As shown in FIG. 13, the apparatus 14 of FIG. 1 is illustrated in a portable configuration with the switches 24 and 26 attached to the roadway 20 at a location adjacent to the vehicle weighing mechanism 32 while switches 28 and 30 are mounted in grooves 140 and 142 of ramps 144 and 146 positioned at the front and rear of the base plate 54 supporting the fiber-optic sensors 34 and 36. The encasements of the fiber-optic sensors 34 and 36 are shown being contacted by pins 68 of grids 64 and 66 underlying the pressure plate 72. While FIG. 13 is primarily directed to showing the FIG. 1 embodiment in a portable configuration, it will appear clear that this Figure is also illustrative of the portable configuration of the embodiments of FIGS. 4 or 8 in which a switch-supporting ramp arrangement similar to that provided by ramps 144 and 146 is utilized.

FIG. 14 is illustrative of the entire switch and sensor system of the FIG. 1 embodiment contained within a housing with removable ramps 148 and 150 with the switches 24, 26, and 28 being contained on ramp 148. As shown in FIGS. 13 and 14, the underside of the ramps are provided with longitudinally extending grooves 152 for routing electrical cables. Also, in these portable configurations the base plate 54 may be provided with grooves for electrical cable routing.

Figure 15:
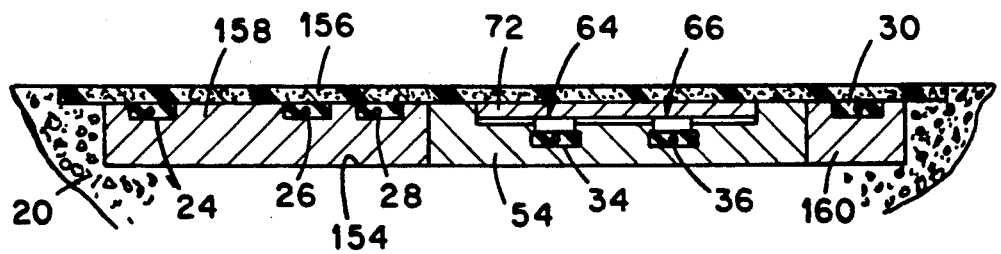
FIG. 15 is a vertical sectional view showing the embodiment of FIG. 1 embedded in a vehicle roadway.

FIG. 15 is an illustration showing the FIG. 1 embodiment embedded in a roadway 20 formed of concrete or other relatively non-yielding material which will provide negligible inaccuracies in any signals from the optical sensors due to any yielding of the road bed underlying the base plate 54. The embedding of the apparatus of FIG. 1 or the apparatus of FIGS. 4, 8, or 10 may be readily achieved by providing a cavity 154 in the roadway 20 and then covering the apparatus with a thin layer 156 of asphalt or the like. In FIG. 15, the switches 24, 26, 28, and 30 are supported in grooved base plates 158 and 160 which are shown as being of substantially the same thickness as the vehicle weighing mechanism 32 so as to position the switches near the surface of the roadway. However, depending upon the configuration of the cavity, the relative thicknesses of the base plates 158 and 160 may be different from that shown.

It will be seen that the present invention provides apparatus for weighing vehicles in motion that are highly accurate, portable and considerably less expensive than the static vehicle weighing systems presently in use on the nation's highways. Also, the apparatus of the present invention provide for the determination of other vehicle characteristics which are important to law enforcement agencies, such as vehicular speed, number of axles, tires per axle, weight distribution on tire of each axle, and tire footprint, the provision of which is essentially nonexistent with known weigh-in-motion systems.

What is claimed is:

1. Apparatus for weighing and identifying characteristics of a vehicle in motion including vehicle weight comprising, an elongated base having upper and lower surfaces and positionable on a vehicle roadway transverse to a path of a moving vehicle for traverse thereby, a plurality of parallel elongated grooves in the upper surface of said base extending over substantially the length thereof with said grooves being spaced apart from one another and transverse to the path of the vehicle, a plurality of elongated fiber-optic sensing means supported by said base for sensing the weight of the vehicle in motion and with one of said plurality of fiber-optic sensing means in each of said plurality of grooves and extending over substantially the length thereof, light source means located at one end of each fiber-optic sensing means for transmitting light therethrough, a plurality of light receiving means with one of said plurality of light receiving means located at an opposite end of each fiber-optic sensing means for receiving an amount of light transmitted therethrough, and contact grid means in contact with each of the plurality of fiber-optic sensing means for varying the amount of light transmitted though each of said plurality of fiber-optic sensing means when subjected to the weight of a moving vehicle, each of said contact grid means adapted to provide a different level of contact with the fiber-optic sensing means contacted thereby for providing each of the plurality of fiber-optic sensing means with a different sensitivity to vehicle weight so that different amounts of light are transmitted through each of the plurality of fiber-optic sensing means when subjected to the same vehicle weight.

2. Apparatus for weighing and identifying characteristics of a moving vehicle as claimed in claim 1, wherein each of said contact grid means comprises a plurality of discrete pin means transversely positioned over each of the optical fibers for the contacting of each optical fiber at spaced apart locations along substantially the length thereof, and wherein the different level of contact with the optical fibers provided by each contact grid means is achieved by providing each contact grid means with a different spacing between adjacent pin means over substantially the length of each optical fiber.

3. Apparatus for weighing and identifying characteristics of a moving vehicle as claimed in claim 1, wherein each fiber-optic sensing means comprises a substantially round optical fiber of silicone rubber.

4. Apparatus for weighing and identifying characteristics of a moving vehicle as claimed in claim 3, wherein each optical fiber of silicone rubber is embedded in an encasement of elastomeric material of a size and configuration substantially corresponding to that of the groove means containing the encasement.

5. Apparatus for weighing and identifying characteristics of a moving vehicle as claimed in claim 1, wherein a plurality of on/off switch means are disposed in spaced apart locations in a plane parallel to and are substantially coextensive with said fiber-optic sensing means for providing signals indicative of the speed of the moving vehicle, number of axles on the vehicle, tire position, and the wheel base of the vehicle, and wherein said switch means are adapted to be contacted by tires on each axle of a plurality of axles on the moving vehicle as the vehicle traverses the switch means for providing said signals.

6. Apparatus for weighing and identifying characteristics of a moving vehicle as claimed in claim 5, wherein a least one of said switch means is disposed on each side of the plurality of the fiber-optic sensing means.

7. Apparatus for weighing and identifying characteristics of a moving vehicle as claimed in claim 5, wherein the plurality of switch means comprises first, second and third elongated switches, wherein the first and second switches are disposed parallel to one another on one side of said plurality of fiber-optic sensing means at preselected transversely spaced apart locations in the path of the moving vehicle for traverse thereby, wherein the third switch means is positioned between the spaced apart first and second switches and is disposed diagonally thereto so as to provide the first, second and third switches with a generally N-shaped configuration, and wherein contacting the third switch with one or more tires on each axle of the moving vehicle provides a signal with the duration thereof being indicative of the number of tires and the tire footprint on each axle of the moving vehicle.

8. Apparatus for weighing and identifying characteristics of a moving vehicle as claimed in claim 5, wherein pressure for contacting said grid means are supported by said base means on the upper surface thereof and extend over said contact grid means and the fiber-optic sensing means, wherein said pressure plate means are contactable by tires on each axle of the moving vehicle for displacing said grid means into said fiber-optic sensing means.

9. Apparatus for weighing and identifying characteristics of a moving vehicle as claimed in claim 7, wherein the first, second and third switches each comprises normally open electrical contacts that are closable upon contact with the tires on each axle of the moving vehicle for providing signals from each of said first, second, and third switches.

10. Apparatus for weighing and identifying characteristics of a moving vehicle as claimed in claim 7, wherein the first, second and third switches each comprises an elongated optical fiber, housing means for supporting each optical fiber, wherein a separate light source means is at one end of each optical fiber, and wherein one of said plurality of light receiving means is at an opposite end of each optical fiber.

11. Apparatus for weighing and identifying characteristics of a moving vehicle as claimed in claim 10, wherein each optical fiber is a substantially round optical fiber formed of silicone rubber.

12. Apparatus for weighing and identifying characteristics of a moving vehicle as claimed in claim 11, wherein each of the housing means comprises elastomeric material forming, an encasement about the optical fiber supported thereby.

13. Apparatus for weighing and identifying characteristics of a moving vehicle as claimed in claim 5, wherein interface means are coupled to each of said light-receiving means and said switch means for receiving the signals therefrom, and wherein signal processing means are coupled to said interface means for receiving signals from said interface means.

14. Apparatus for weighing and identifying characteristics of a moving vehicle as claimed in claim 13, wherein temperature sensing means are supported by said base and coupled to said interface means for providing a signal thereto indicative of ambient temperature.

15. Apparatus for weighing and identifying characteristics of a moving vehicle as claimed in claim 5, wherein said base including said grooves means, said fiber-optic sensing means, said light transmitting means, said light receiving means, and said contact grid means form a discrete vehicle weighing unit, and wherein the apparatus comprises two of said vehicle weighing units disposed end-to-end across the path of the moving vehicle with each weighing unit being contactable by different tires on each axle of the moving vehicle.

16. Apparatus for weighing and identifying characteristics of a moving vehicle as claimed in claim 15, wherein said plurality of switch means defines a set of switch means for contact by tires on the moving vehicle, wherein each of said units is provided with a set of said switch means, and wherein the sets of said switch means are disposed side-by-side across the path of the moving vehicle and separately contactable by different tires on each axle of the moving vehicle.

17. Apparatus for weighing and identifying characteristics of a moving vehicle as claimed in claim 5, wherein each of said plurality of switch means comprises a plurality of individual contact switches positioned at substantially uniformly spaced apart locations in said plane over substantially the length of each of said switch means, wherein a number of said plurality of contact switches are contacted by one or more tires on each axle of the moving vehicle with the number of contacted switches providing signals indicative of the number of tires on each axle, tire position, and the footprint of the tires on each axle.

18. Apparatus for determining characteristics of a vehicle moving along a path including vehicle weight, speed, number of axles, weight distribution on each axle, number of tires on each axle, tire position, and footprint of each tire on each axle of the moving vehicle comprising, first, second and third elongated optical-fiber assembly means positionable on a vehicle roadway in the path of a moving vehicle and contactable by tires on said moving vehicle for providing signals upon being contacted thereby, said first and second optical-fiber assembly means being disposed parallel to each other and transverse to the path of the moving vehicle at spaced apart locations on said roadway, said third optical-fiber assembly means being positioned diagonally to the first and the second optical-fiber assembly means on said roadway at a location between and substantially coextensive with the first optical-fiber assembly means and the second optical-fiber assembly means and thereby emplacing the first, the second and the third optical-fiber assembly means in a generally N-shaped configuration, a plurality of light source means with one of said light source means at one end of each of the optical-fiber assembly means for transmitting light therethrough, and a plurality of light receiving means with one of said light receiving means at an opposite end of each optical-fiber assembly means for receiving the light transmitted through each of said optical-fiber assembly means with the light being transmitted through each of the optical-fiber assembly means being changed in intensity upon being contacted by the one or more tires on each axle on the moving vehicle, whereby the change in the light intensity in each of the optical-fiber assembly means is dependent upon a proportional amount of the vehicle weight supported by the one or more tires on the axle contacting each optical-fiber assembly means for providing said signals with said signals being indicative of the vehicle weight and the distribution of the vehicle weight on each axle, whereby differences in time between the contact of the first optical-fiber assembly means and the second optical-fiber assembly means by the tires on same axle of the vehicle is indicative of the speed of the moving vehicle, and whereby a duration of the change in the light intensity transmitted through the third optical-fiber assembly means during contact with one or more tires on each axle of the moving vehicle is indicative of the number of tires on each axle and the footprint of each tire.

19. Apparatus as claimed in claim 18, wherein each optical-fiber assembly means comprises a substantially round optical fiber of silicone rubber embedded in an encasement of elastomeric material.

20. Apparatus as claimed in claim 19, wherein each encasement is provided with a generally rounded upper surface for providing the pathway for the moving vehicle over the optical fiber embedded therein.

* * * * *